(12) United States Patent
Trouvé et al.

(10) Patent No.: US 8,727,287 B2
(45) Date of Patent: May 20, 2014

(54) FITTING ASSEMBLY HAVING A RETAINING CLIP

(75) Inventors: Damien Trouvé, Cluses (FR); Harry Edward Koontz, Troy, MI (US); Joseph Matthew Laperriere, III, Chesterfield, MI (US)

(73) Assignee: Kongsberg Driveline Systems I, Inc, Novi, MI (US)

( * ) Notice: Subject to any disclaimer, the term of this patent is extended or adjusted under 35 U.S.C. 154(b) by 159 days.

(21) Appl. No.: 13/139,248

(22) PCT Filed: Dec. 15, 2009

(86) PCT No.: PCT/US2009/068071
§ 371 (c)(1),
(2), (4) Date: Jul. 29, 2011

(87) PCT Pub. No.: WO2010/077871
PCT Pub. Date: Jul. 8, 2010

(65) Prior Publication Data
US 2011/0290949 A1 Dec. 1, 2011

Related U.S. Application Data

(60) Provisional application No. 61/201,779, filed on Dec. 15, 2008.

(51) Int. Cl.
*F16L 5/00* (2006.01)
*F16C 1/10* (2006.01)

(52) U.S. Cl.
CPC *F16C 1/105* (2013.01); *F16C 1/106* (2013.01)
USPC ............. 248/56; 248/49; 248/74.2; 74/502.4; 74/502.6

(58) Field of Classification Search
CPC ................. F16C 1/105; F16C 1/106
USPC ............ 248/49, 68.1, 74.2, 56; 403/195, 193, 403/197; 74/502.4, 502.6, 501.5
See application file for complete search history.

(56) References Cited

U.S. PATENT DOCUMENTS 2,744,769 A 5/1956 Roeder et al.
3,366,356 A * 1/1968 Fisher ............................. 248/56

(Continued)

FOREIGN PATENT DOCUMENTS

DE 2261933 A1 7/1974
EP 1406024 A2 7/2004

(Continued)

OTHER PUBLICATIONS

International Search Report and Written Opinion mailed Sep. 21, 2010, corresponding to counterpart PCT international application PCT/US2009/068071.

*Primary Examiner* — Amy Sterling
(74) *Attorney, Agent, or Firm* — Howard & Howard Attorneys PLLC

(57) ABSTRACT

A fitting assembly adapted for securing an elongate member to a bracket having an open-ended slot into which the fitting assembly is received. The fitting assembly includes a first fitting member adapted for attachment to the elongate member and having an axis and a second fitting member adapted for receipt into the open end of the slot and fixed engagement with the bracket through relative movement between the second fitting member and the bracket solely in a direction substantially lateral to the axis. The first and second fitting members are connected together and have first and second positions relative to each other in a direction substantially lateral to the axis and are constrained against relative movement substantially along the axis. The first and second fitting members are substantially immovable relative to each other in a direction substantially lateral to the axis in the second position.

19 Claims, 12 Drawing Sheets

(56) References Cited

U.S. PATENT DOCUMENTS

| | | |
|---|---|---|
| 3,528,313 A | 9/1970 | Berno |
| 3,631,738 A | 1/1972 | Harper |
| 4,074,945 A | 2/1978 | Kraus et al. |
| 4,458,552 A | 7/1984 | Spease et al. |
| 4,601,448 A | 7/1986 | Miyazaki et al. |
| 4,763,541 A | 8/1988 | Spease |
| 4,951,524 A | 8/1990 | Niskanen |
| 5,161,428 A | 11/1992 | Petruccello |
| 5,272,934 A | 12/1993 | Chegash et al. |
| 5,347,882 A | 9/1994 | Klotz |
| 5,553,818 A | 9/1996 | Wild |
| 5,596,908 A | 1/1997 | Hall |
| 5,613,406 A | 3/1997 | Rutkowski |
| 5,615,584 A | 4/1997 | Irish |
| 5,908,180 A | 6/1999 | Daoud |
| 5,911,790 A | 6/1999 | Bates et al. |
| 6,171,141 B1 | 1/2001 | Yasui et al. |
| 6,178,844 B1 | 1/2001 | Burger |
| 6,295,889 B1 | 10/2001 | Jones |
| 6,332,806 B1 | 12/2001 | Yasui et al. |
| 6,490,947 B2 | 12/2002 | Burger |
| 6,634,252 B2 | 10/2003 | Mayville et al. |
| 7,029,194 B2 | 4/2006 | Ishikawa et al. |
| 2004/0149480 A1* | 8/2004 | Ball .......................... 174/77 R |

FOREIGN PATENT DOCUMENTS

| | | |
|---|---|---|
| EP | 1498620 A1 | 1/2005 |
| FR | 2723989 A1 | 3/1996 |
| GB | 2346186 A | 8/2000 |
| JP | H02-005607 U | 1/1990 |
| JP | 2000065034 A | 3/2000 |
| WO | 2007/056650 A2 | 5/2007 |

\* cited by examiner

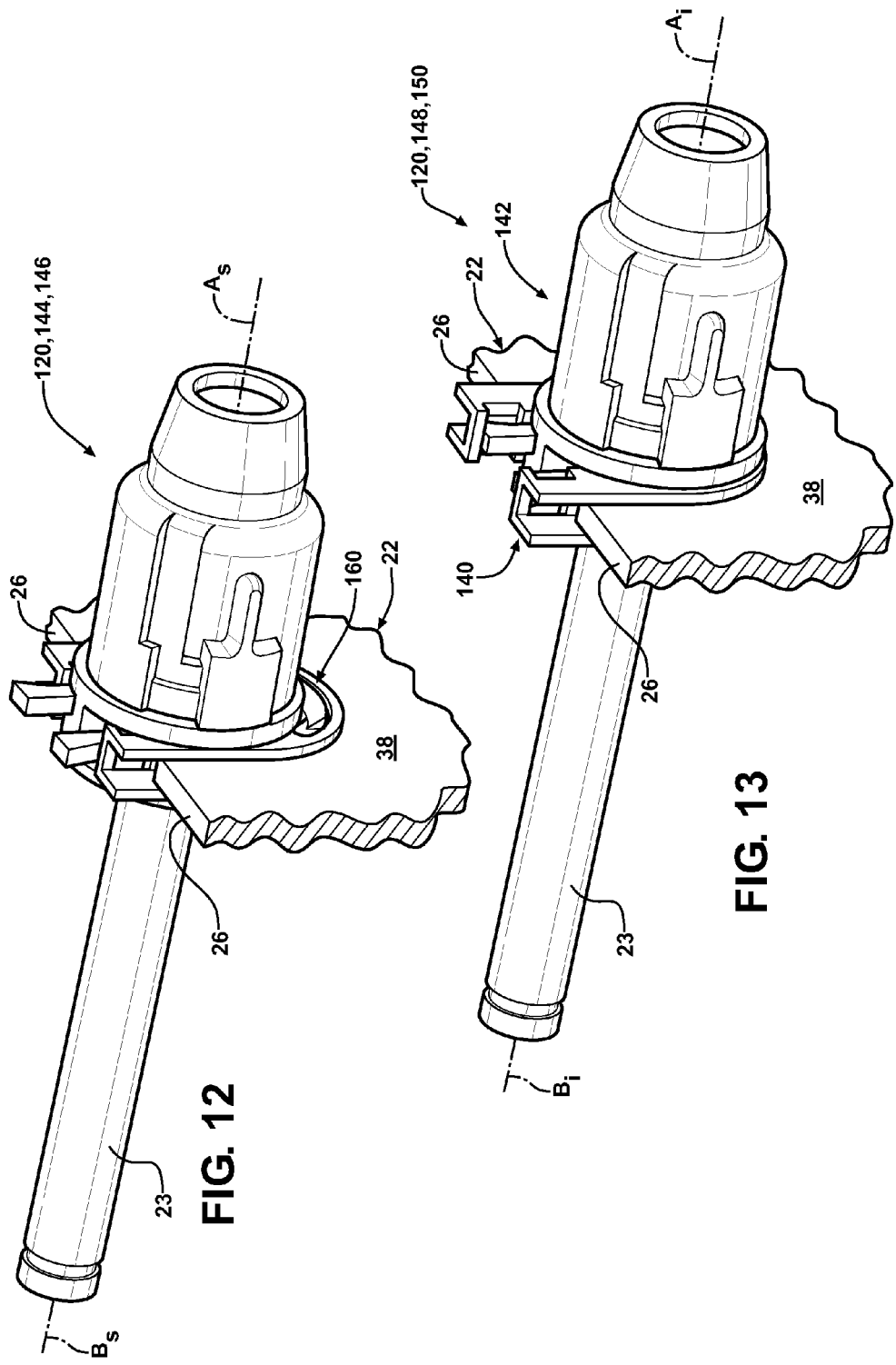

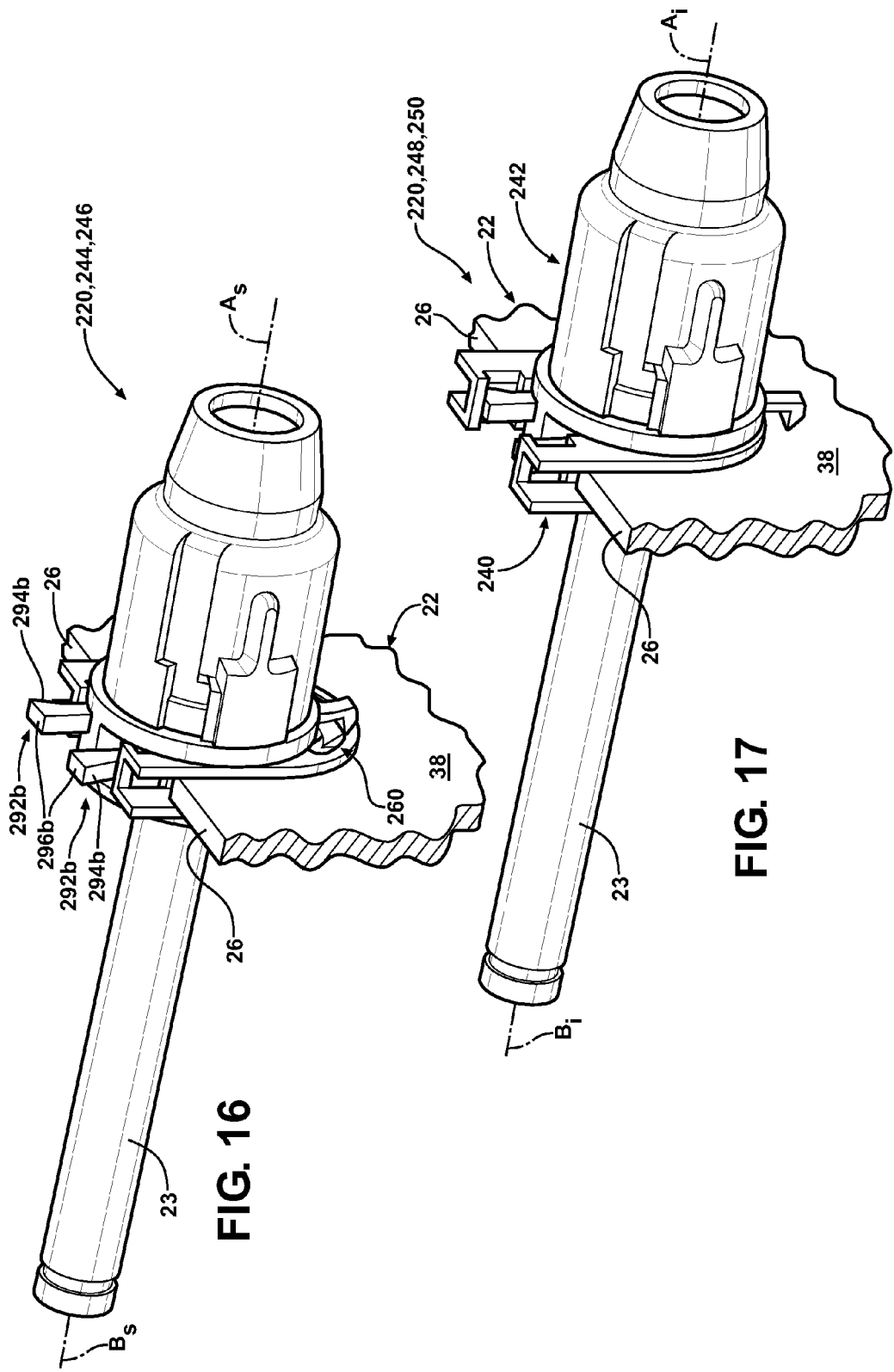

FITTING ASSEMBLY HAVING A RETAINING CLIP

CROSS-REFERENCE TO RELATED APPLICATIONS

This application claims priority to and all the benefits of International Application No. PCT/US2009/068071, which was filed on Dec. 15, 2009, with the World Intellectual Property Organization, and which claims priority to U.S. Provisional Patent Application Ser. No. 61/201,779 filed on Dec. 15, 2008, the disclosures of which are expressly incorporated herein by reference.

BACKGROUND OF THE INVENTION

1. Field of the Invention

The invention generally relates to an end fitting assembly for coupling an elongate member such as a cable conduit to a bracket.

2. Description of the Related Art

It is known to attach a cable conduit end to a bracket secured to a vehicle, wherein the bracket includes an open ended slot provided in the edge of a plate member. The conduit end is provided with a fitting that is received vertically into the top of the slot at the plate edge. The bracket has a projection or upset that extends from a planar side surface of the bracket near the bottom of the slot. Prior conduit end fittings are provided with a collar that moves axially along the axis of the conduit into an engaged position in which the upset is received inside the collar, and lateral movement of the conduit out of the slot is opposed by the abutting engagement of the inside surface of the collar with the upset or projection. Typically, the collar is slid or threadedly rotated into its engaged position, and may be biased towards its engaged position by a compression spring disposed between the collar and a retaining cap fixed to the conduit housing. An example of one such prior fitting assembly is shown in U.S. Pat. No. 6,295,889 (Jones).

A disadvantage of prior fitting assemblies adapted to be received in and secured to such brackets is that package space is often at a premium, and cannot accommodate axially sliding collars, particularly those that required biasing spring mechanisms or collars which must be threadably rotated into their engaged position.

It would be desirable to provide a fitting assembly for attaching elongate members, such a cable conduits for example, vertically into an open ended slot formed in a bracket, without the need of a collar that slides or screws axially on the end fitting, and which can be installed and secures the fitting to the bracket solely through a single motion substantially lateral to the axis of the fitting that requires a low insertion force, and which provides high retention force.

SUMMARY OF THE INVENTION

In one form, the present invention provides a fitting assembly for engagement of a cable conduit or sheath end to a vehicle-mounted bracket without the need of a collar that slides or screws axially on the end fitting. In a single motion, the fitting of the present invention moves through a two stage engagement process which requires a low insertion effort and provides a high retention force. The end fitting assembly is a two piece design including interengaged retention clip and cable conduit end housing assembly members that are stabilized relative to each other in a first position and together inserted vertically into an open-ended slot in the bracket in a direction substantially lateral to the conduit axis. A flange on its bracket clip member deflects when it engages an upset or projection provided on the bracket surface and then returns into place. After the retention clip member is seated in the slot and is snapped over the upset or projection, fingers of the end fitting housing assembly member then deflect inward and the end fitting housing member continues its vertical movement relative to the clip member and the bracket, and locks in a second position relative to the clip member. When this occurs, a retaining surface on the end fitting housing member is then in superposition over the flexible flange of the bracket clip member, to prevent it from deflecting and resulting in high retention of the fitting assembly and the conduit end to the racket. As used herein, the terms "vertical" or "vertically" refer not to relative positions of differing heights, but rather to orientations relative to the longitudinal directions into and out of the end of an open-ended slot in the bracket. Generally, the vertical directions will be laterally relative to the longitudinal axis defined by the conduit or the fitting assembly, and substantially parallel with the opposed planar sides of the exemplary bracket.

To accomplish the sequence of first having the flange of the clip member engage and capture the upset, and then having the end fitting housing member move to the installed state the designed loads are such that the load to deflect the retention clip member flange over the upset on the bracket will always be less than the load to relatively move the end fitting housing and retention clip members between their first and second positions.

To remove the end fitting housing and the cable conduit end from the bracket, the fingers of the end fitting housing member can be deflected and the end fitting housing and cable assembly end can be easily removed from the retention clip member while it remains seated in the bracket slot. The retention clip member can then be removed, if required, by deflecting the flexible flange, or it may be left attached to the bracket and the cable end fitting housing assembly member alone reinserted or replaced.

The present invention provides a fitting assembly adapted for securing an elongate member to a bracket having an open-ended slot into which the fitting assembly is received, the fitting assembly including a first fitting member adapted for attachment to the elongate member and having an axis, and a second fitting member adapted for receipt into the open end of the slot and fixed engagement with the bracket through relative movement between the second fitting member and the bracket solely in a direction substantially lateral to the axis. The first and second fitting members are connected together and have first and second positions relative to each other in a direction substantially lateral to the axis, and are constrained against relative movement substantially along the axis. The first and second fitting members are substantially immovable relative to each other in a direction substantially lateral to the axis in the second position.

The elongate member may be a conduit and the fitting assembly adapted for securing a conduit end against longitudinal and lateral movement relative to the bracket.

The second fitting member may have a seated position in the slot, with the second fitting member fixedly engageable with the bracket in its seated position, and the second fitting member may include a flange adapted for superposition relative to a planar bracket surface located adjacent the slot. The flange may have an edge adjacent which a projection from the planar bracket surface is interfacingly disposed in the second fitting member seated position, with movement of the second fitting member from its seated position opposed by abutting engagement of the edge with the interfacing projection. The edge may at least partially define an aperture in the flange, and the flange may be elastically deformed in a direction substantially along the axis by an amount sufficient to allow the projection to be relatively moved past the edge as the second fitting member is moved into or out of its seated position. The first fitting member may include a retaining surface that is moved into engagement with the flange, and that opposes the elastic deformation of the flange in the second position, the edge thus retained in an interfacing relationship with the projection in the second position. Relative movement of the first and second fitting members into the second position while the flange is elastically deformed in a direction substantially along the axis may be prevented by interference of the flange with the movement of the retaining surface into a superposed position over the flange.

In certain embodiments, the first and second fitting members may be provided with retention features that are cooperatively inter-engaged in the first position and cooperatively disengaged during relative movement from the first position toward the second position. At least one of the retention features may be deformed during relative movement of the first and second fitting members out of the first position. The retention feature deformation may be at least partially a reaction to the first and second fitting members being forced against each other into the second position, and may be at least partially a reaction to the first and second fitting members being forced against the bracket.

In certain embodiments, the first and second fitting members may be provided with retention features that are cooperatively disengaged in the first position and during relative movement toward the second position, and wherein the retention features are biased into cooperative engagement in the second position. At least one of the retention features may be deformed during relative movement of the first and second fitting members out of the first position. The retention feature deformation may at least partially be a reaction to the first and second fitting members being forced against each other into the second position, and the retention feature deformation may at least partially be a reaction to the first and second fitting members being forced against the bracket.

From the first position, relative movement of the first and second fitting members in directions toward the second position is facilitated, while relative movement of the first and second fitting members in directions away from the second position is automatically prevented, by the retention features. For example, the relative movements of the first and second fitting members from the first position in directions toward and away from the second position may be respectively facilitated and automatically prevented by a retention feature respectively slidably engaging a ramped surface and abutting a retaining shoulder surface.

The retention features may include opposed first and second edges that at least partially define a void in one of the first and second fitting members, and a finger extending from the other of the first and second fitting members, with the ramped and retaining shoulder surfaces defined on the finger and facing in substantially opposite directions. The first edge and the retaining shoulder surface may be superposed in the first position, and the second edge may be slidably engaged with the ramped surface upon movement from the first position toward the second position.

The fitting assembly preferably has a shipped or installing state in which the first and second fitting members are stabilized in the first position, and an installed state in which the first and second fitting members are retained in the second position and the second member is in fixed engagement with the bracket.

BRIEF DESCRIPTION OF THE DRAWINGS

To accomplish the above and related objects, the invention may be embodied in a form illustrated in the accompanying drawings, attention being called to the fact, however, that the drawings are illustrative only, and that changes may be made in the specific construction illustrated. Moreover, it is to be noted that the accompanying drawings are not necessarily drawn to scale or to the same scale. In particular, the scale of some of the elements of the drawings may be exaggerated to emphasize characteristics of the elements.

Various other objects, features and attendant advantages of the present invention will become fully appreciated as the same becomes better understood when considered in conjunction with the accompanying drawings, in which like reference characters designate the same or similar parts throughout the several views, and wherein:

FIG. 12 is a second view illustrating the installation of the second embodiment vertical end fitting to a bracket, the cable end fitting housing and retainer clip shown in a shipped or installing state; the latter shown seated in the bracket slot;

FIG. 13 is a third view illustrating the installation of the second embodiment vertical end fitting to a bracket, the cable end fitting housing and retainer clip shown in an installed state;

FIG. 16 is a second view illustrating the installation of the third embodiment vertical end fitting to a bracket, the cable end fitting housing and retainer clip shown in a shipped or installing state, the latter shown seated in the bracket slot; and FIG. 17 is a third view illustrating the installation of the third embodiment vertical end fitting to a bracket, the cable end fitting housing and retainer clip shown in an installed state.

Figure 1:
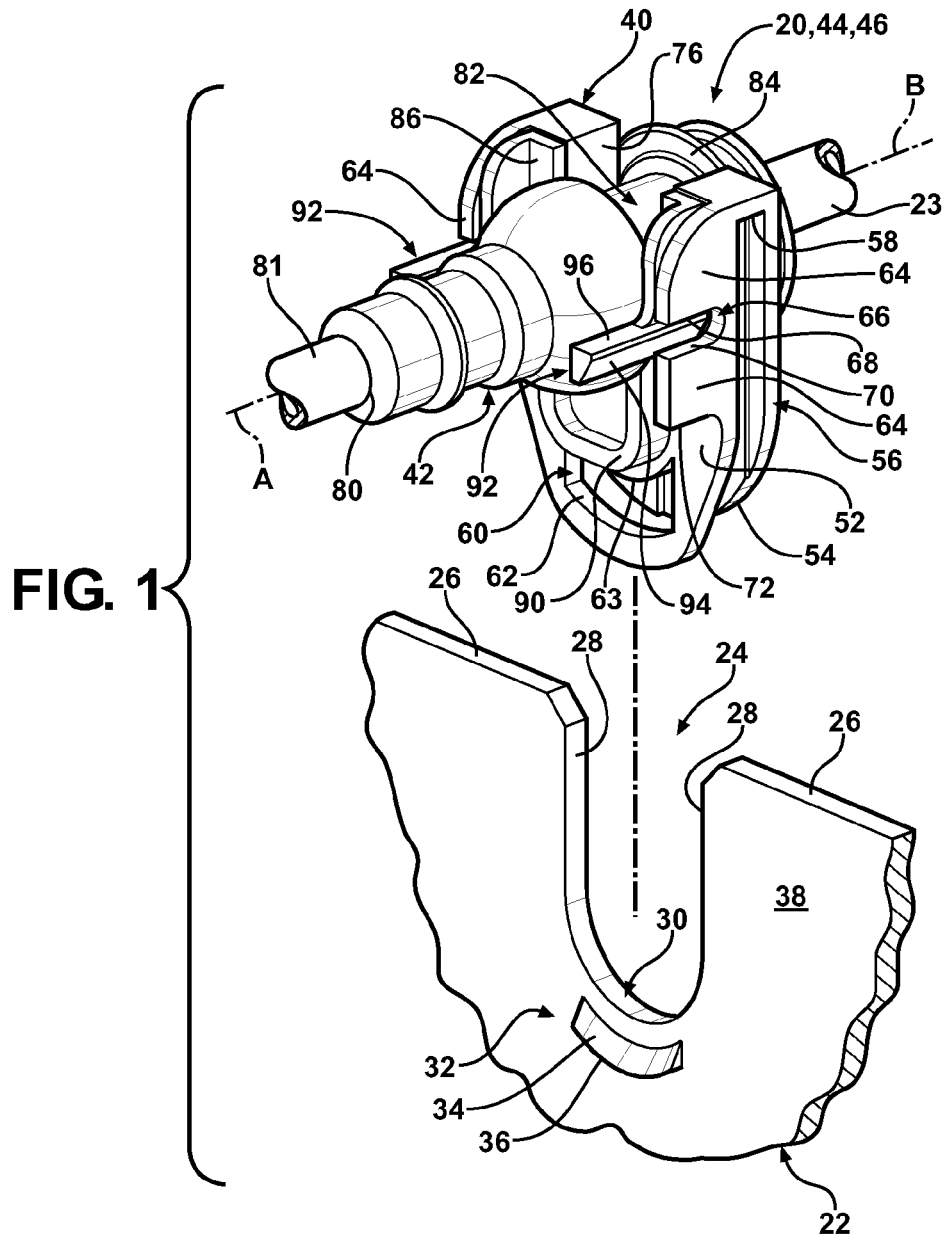
FIG. 1 is a partially exploded perspective view of a first embodiment vertical end fitting assembly and a bracket having a slot.

While the invention is susceptible to various modifications and alternative forms, specific embodiments thereof are shown by way of example in the drawings and may herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Elements shown in more than one FIGURE that may be substantially identically configured have been indicated using the same reference numerals.

DETAILED DESCRIPTION OF EXEMPLARY EMBODIMENTS

Figure 2:
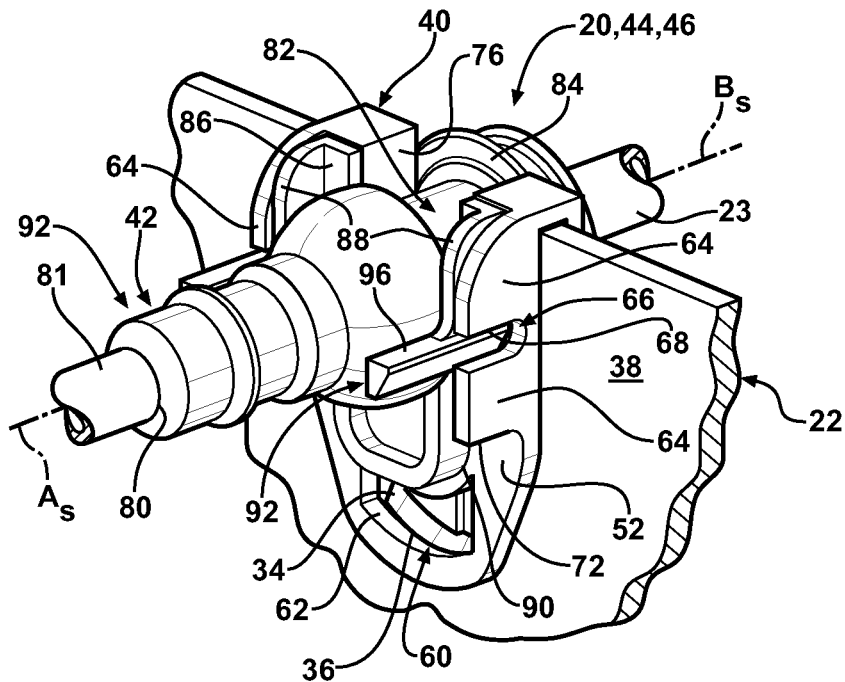
FIG. 2 is a perspective view of the first embodiment vertical end fitting assembly of FIG. 1 disposed within the slot of the bracket with a retaining clip in an open position.
Figure 3:
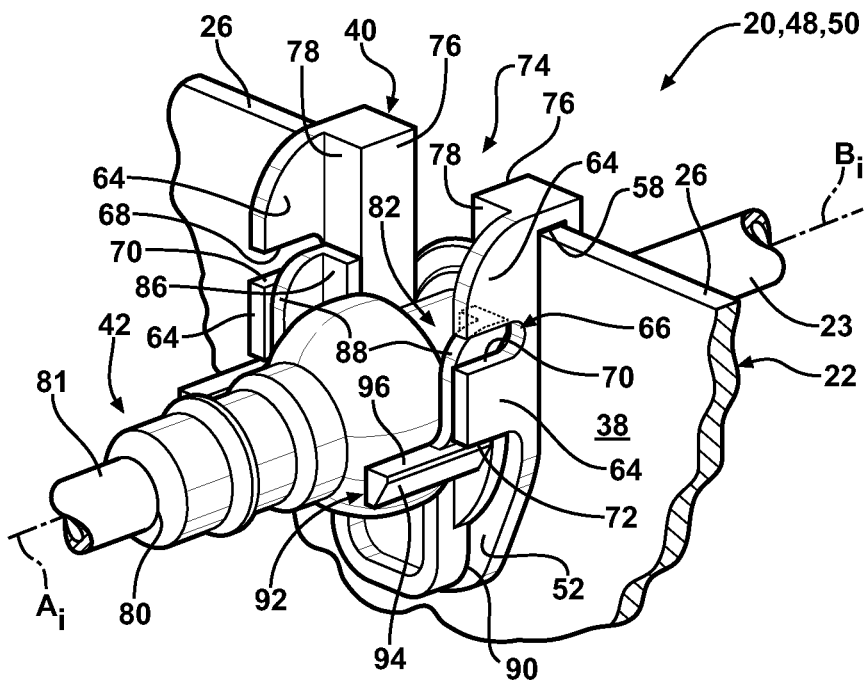
FIG. 3 is a perspective view of the first embodiment vertical end fitting assembly of FIG. 1 disposed within the slot of the bracket with the retaining clip in a locked position.

Referring to FIGS. 1 through 3 there is shown a first embodiment cable end fitting assembly 20 that is attachable to bracket 22. Bracket 22 may be integrally formed to a member attached to a vehicle. An injection molded swivel tube 23 is attachable to cable end fitting assembly 20 prior to or during the installation of cable end fitting assembly 20 into bracket 22. Swivel tube 23 may be included in assembly with cable end fitting assembly 20 as it is shipped to the site of its installation, or it may be assembled to cable end fitting assembly 20 at the installation site. A cable wire (not shown) is included in assembly with cable end fitting assembly 20 and extends from the end of fitting assembly 20 and through swivel tube 23. Bracket 22 includes an open-ended slot 24 formed in an edge 26 of a plate or flange, with slot 24 defined by opposite sides 28 extending from edge 26 and joined along semi-circular bottom 30 of slot 24. Bracket 22 includes upset or projection 32 located below slot bottom 30 that includes upwardly facing ramped surface 34 and opposite, downwardly facing retaining shoulder surface 36. Retaining shoulder surface 36 extends perpendicularly from planar surface 38 of bracket 22.

Cable end fitting assembly 20 is preferably a two-part device including retainer clip member 40 (which is also referenced herein a second fitting member 40) and cable end fitting housing assembly member 42(which is also referenced as a first fitting member 42). Retainer clip member 40 and housing assembly member 42 are subassembled prior to shipping to the assembly site, and cable end fitting assembly 20 has a shipped or installing state 44 in which cable end fitting assembly 20 and bracket 22 are in either a separated or a partially assembled but unlocked relationship 46. With fitting assembly 20 in a shipped or installing state 44 and having unlocked relationship 46 with bracket 22, fitting members 40 and 42 are stabilized in a first position relative to each other. Cable end fitting assembly 20 also has an installed state 48 in which it and bracket 22 have a locked relationship 50. With fitting assembly 20 in an installed state 48 and having locked relationship 50 with bracket 22, fitting members 40 and 42 are retained in a second position relative to each other.

Cable end fitting assembly 20 has a longitudinal axis A that in the shipped or installing state 44 is designated as axis $A_s$, and swivel tube 23, once inserted into cable end fitting housing assembly 42, has a longitudinal axis B that is substantially aligned with axis A. In the shipped or installing state 44 of cable end fitting assembly 20, axis B of inserted swivel tube 23 is designated as axis $B_s$. In the installed state 48, axes A and B are respectively designated axis $A_i$ and axis $B_i$.

Retainer clip member 40 includes first flange 52 which, in the installed state 48, superposes bracket surface 38 about the periphery of slot 24, and opposite second flange 54 which, in the installed state, superposes the opposite surface (not shown) of bracket 22 about the periphery of slot 24. Between first and second flanges 52, 54, retainer clip member 40 has groove 56 that extends between opposite ends 58 thereof, and in the installed state 48 ends 58 are disposed adjacent to edges 26 on opposite sides of slot 24. First flange 52 includes aperture 60 that is partially defined by bottom edge 62 that corresponds to the shape, length, and thickness relative to its projection height from surface 38, of retaining shoulder surface 36 of upset or projection 32.

Retainer clip member 40 further includes axially extending walls 64 disposed on each lateral side of longitudinal axis A, each axially extending wall 64 including an axially extending slot or void 66 that is open at one end and defined by an upper edge 68 and a substantially parallel lower edge 70. Axially extending walls 64 each also define a lower edge 72 that is substantially parallel with slot edges 68 and 70, and is located on the side of slot 66 opposite the top of retainer clip member 40. Retainer clip member 40 defines a U-shaped channel 74 open at the top and including opposed interior walls 76. Adjacent interior walls 76, first flange 52 of retainer clip 40 has axially facing surfaces 78 that face the same direction as bracket planar surface 38.

Cable end fitting housing assembly member 42 has bore 80 centered about axis A through which coaxially extends cable conduit or sheath 81. The end of conduit or sheath 81 is fixed relative to cable end fitting housing assembly 42, with the cable wire (not shown) extending through and moveable relative to conduit or sheath 81 and swivel tube 23 generally in the directions of axes A and B.

Housing assembly member 42 has an outer circumferential groove 82 which is slidably received in U-shaped channel 74 of retainer clip member 40, with groove 82 defined on one axial side by circular flange 84 of member 42 and on the opposite axial side by its planar portions 86. Planar portions 86 are slidably superposed over axially facing surfaces 78 of retainer clip member 40. Planar portions 86 each have extending therefrom an axially extending wall 88. Walls 88 are joined at the lower, central portion of housing member 42 to define rigid, planar retaining surface 90 that extends downwardly from axis A and faces towards bracket surface 38 and flange 52. Rigid retaining surface 90 is selectively positioned in overlapping relationship relative to flexible flange 52 and over aperture 60 and prevents flange 52 from being elastically deformed such that it is separated from bracket surface 38. That is to say, with cable end fitting assembly 20 in its installed state 48 and having a locked relationship 50 with bracket 22, in which upset or projection 32 is disposed within aperture 60, flange 52 is sandwiched between bracket surface 38 and the superposed retaining surface 90 and is prevented from being elastically deformed away from bracket surface 38 such that retaining shoulder surface 36 of upset or projection 32 and bottom edge 62 of aperture 60 are taken out of interfacing superposition with each other. The superposition of retainer shoulder surface 36 and bottom edge 62 of aperture 60 prevents cable end fitting assembly 20 in its installed state 48 from being dislodged from slot 24, thereby locking cable end fitting assembly 20 to bracket 22. Relative movement of housing member 42 and clip member 40 toward their first position would be opposed by abutting engagement between upset shoulder surface 36 and interfacingly superposed flange aperture edge 62.

Integrally formed with axially extending walls 88 of housing member 42 are axially extending fingers 92, each provided with downwardly facing ramped surface 94 and upwardly facing retaining shoulder surface 96. In the shipped or installing state 44, fingers 92 are disposed in slots or voids 66 of axially extending walls 64 of retainer clip member 40. With retainer clip member 40 seated into slot 24 with upset or projection 32 disposed within aperture 60, movement of cable end fitting housing assembly member 42 is continued vertically by pushing it laterally relative to axis A and further into U-shaped channel 74. The force exerted in effecting this continued movement elastically deforms one or both of each axially extending wall 64 and 88 such that lower edge 70 of each slot 66 is brought into sliding engagement with the respective ramp surface 94 of each finger 92, and finger 92 proceeds with the remainder of housing member 42 vertically past the portion of the axially extending wall 64 located immediately below slot 66 to its bottom edge 72. With fitting assembly 20 now in installed state 48, upwardly facing retainer shoulder surface 96 of each finger 92 is in superposed or abutting engagement with an edge 72, thereby locking cable end fitting housing assembly member 42 relative to retainer clip member 40. As can be seen from a comparison of FIGS. 2 and 3, during installation of cable end fitting assembly 20, and moving between an unlocked relationship 46 between it and bracket 22 and their locked relationship 50, axes A and B are displaced downwardly further into slot 24 and U-shaped channel 74 along with cable end fitting housing assembly member 42.

During assembly, with the end fitting assembly 20 in its shipped or installing state 44, groove 56 is aligned with the slot 24 of the bracket 22 and the fitting assembly 20 pushed vertically in a direction lateral to axis A, into slot 24 and toward slot bottom 30. During this vertical movement, the groove 56 of retaining clip 40 engages the sides 28 of slot 24 and the bottommost edge of flange 52 approaches the ramped surface 34 of upset or projection 32.

As a user continues to push the end fitting assembly 20 vertically into slot 24 the Retention clip member 40 becomes seated in slot 24, with upset or projection 32 captured within aperture 60, and housing assembly member 42 then continues its sliding movement vertically from the first position to the second position wherein its retaining surface 90 is superpositioned over flange 52 and aperture 60 of the retention clip member 40, to prevent the flange 52 from deflecting away from bracket surface 38 and aperture bottom edge 62 from moving out of interfacing position with shoulder surface 36 of upset or projection 32. During the downward slide of retaining surface 90 over flange 52, the fingers 92 and axially extending walls 88 are deflected by the load applied to move the end fitting housing assembly member 42 into clip member 40. Specifically, the ramped surfaces 94 on the fingers 92 allow the fingers 92 to be automatically deflected inward. Once in the second position retaining shoulder surfaces 96 of fingers 92 are interfacing superposed over lower edges 72 of walls 64.

Thus, with retention clip member 40 and fitting housing member 42 in their first position, as fitting assembly 20 is inserted into slot 24, flange 52 is elastically deflected over the upset or projection 32 until aperture bottom edge 62 is moved past upset shoulder surface 36, at which point flange 52 returns to its relaxed state abutting surface 38 and upset or projection 32 is captured within aperture 60. Then retention clip member 40 and fitting housing member 42 are relatively moved out of their first position and towards their second position, with retaining surface 90 moving downwardly over flange 52 to oppose deflection of flange 52 away from surface 38. The retaining clip member 40 requires only a low insertion effort to secure the upset or projection 32 within the aperture 60 of flange 52, but provides a strong retention coupling of the retaining clip member 40 with the upset or projection 32. The load required to deflect the fingers 92 and move the fitting assembly members 40, 42 to their second position is greater than the load required to deflect the flange 52 and move its edge 62 past surface 36 of the upset or projection 32, thereby ensuring that the end fitting assembly 20, once in installed state 48, will not be inadvertently dislodged from the bracket 22.

To separate the end fitting assembly 20 from the bracket 22, the fingers 92 of the fitting housing member 42 are squeezed toward each other to allow the fitting housing member 42 to be moved from the second position to the first position. Subsequently, the retention clip member 40 can then be separated from the bracket 22 by deflecting the flange 52 over the upset or projection 32 and removing the retention clip 40 from the bracket 22. Thus, subsequent to initial installation of the end fitting assembly 20, fingers 92 function to facilitate serviceability of the end fitting assembly 20.

Referring now to FIGS. 4 through 13, there is shown a second embodiment cable end fitting assembly 120. Relative to second embodiment fitting assembly 120 and the above-described first embodiment fitting assembly 20, substantially identical elements are identically numbered, and elements of fitting assembly 120 that correspond in structure and/or function to elements of fitting assembly 20 are identified by adding a prefix "1" (i.e., adding 100) to the respective element numeral of fitting assembly 20. Additionally, multiple elements of fitting assembly 120 that correspond in structure and/or function to elements of fitting assembly 20 may also include suffixes "a" and "b". The structure and function of identical or corresponding elements between the first and second embodiment fitting assemblies 20, 120 and their relationships to bracket 22 are as described above except as described below or as evident from the accompanying drawings.

Figure 4:
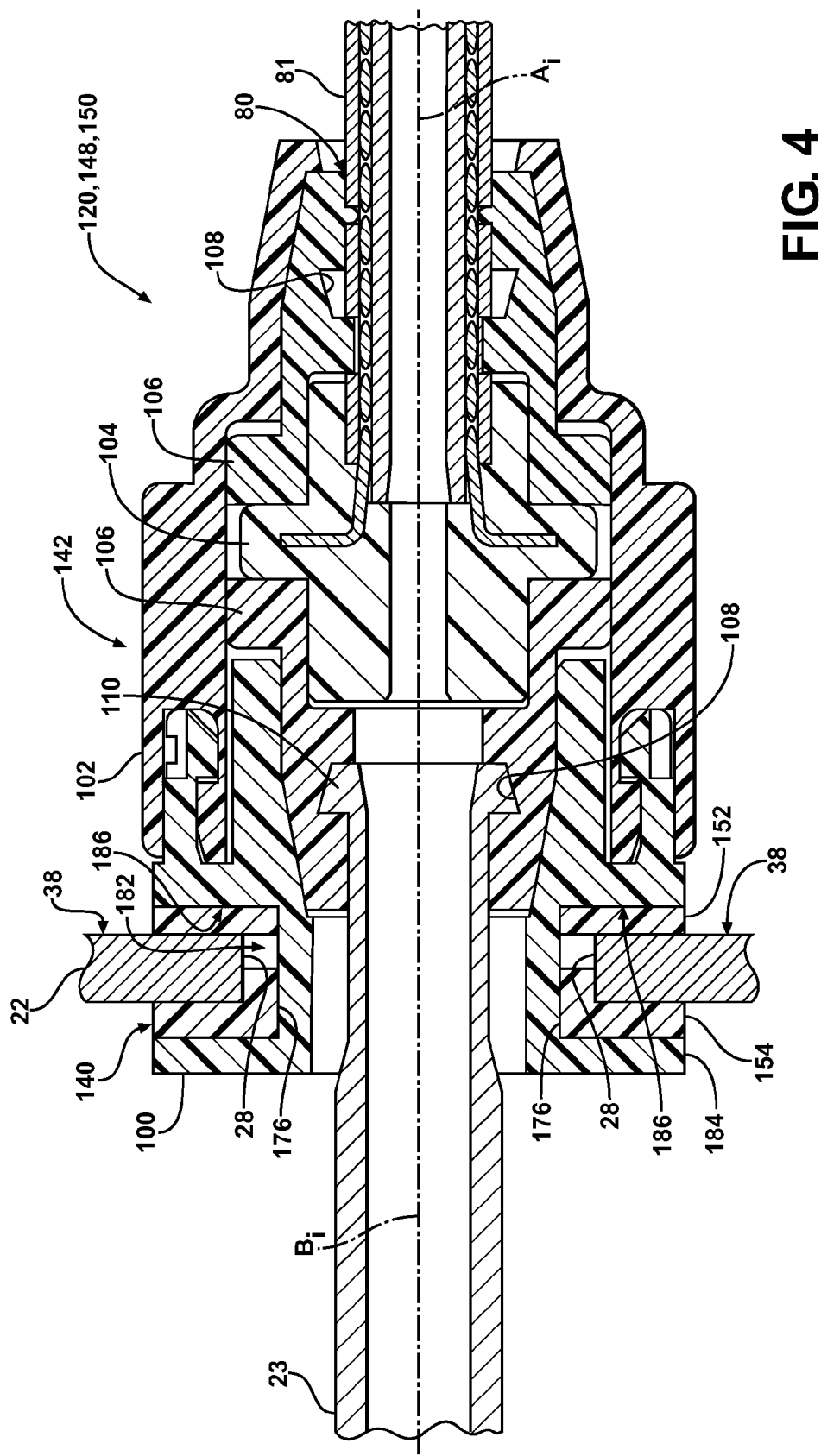
FIG. 4 is a first sectional side view of a second embodiment vertical end fitting assembly disposed within the slot of the bracket with its retaining clip in a locked position.
Figure 5:
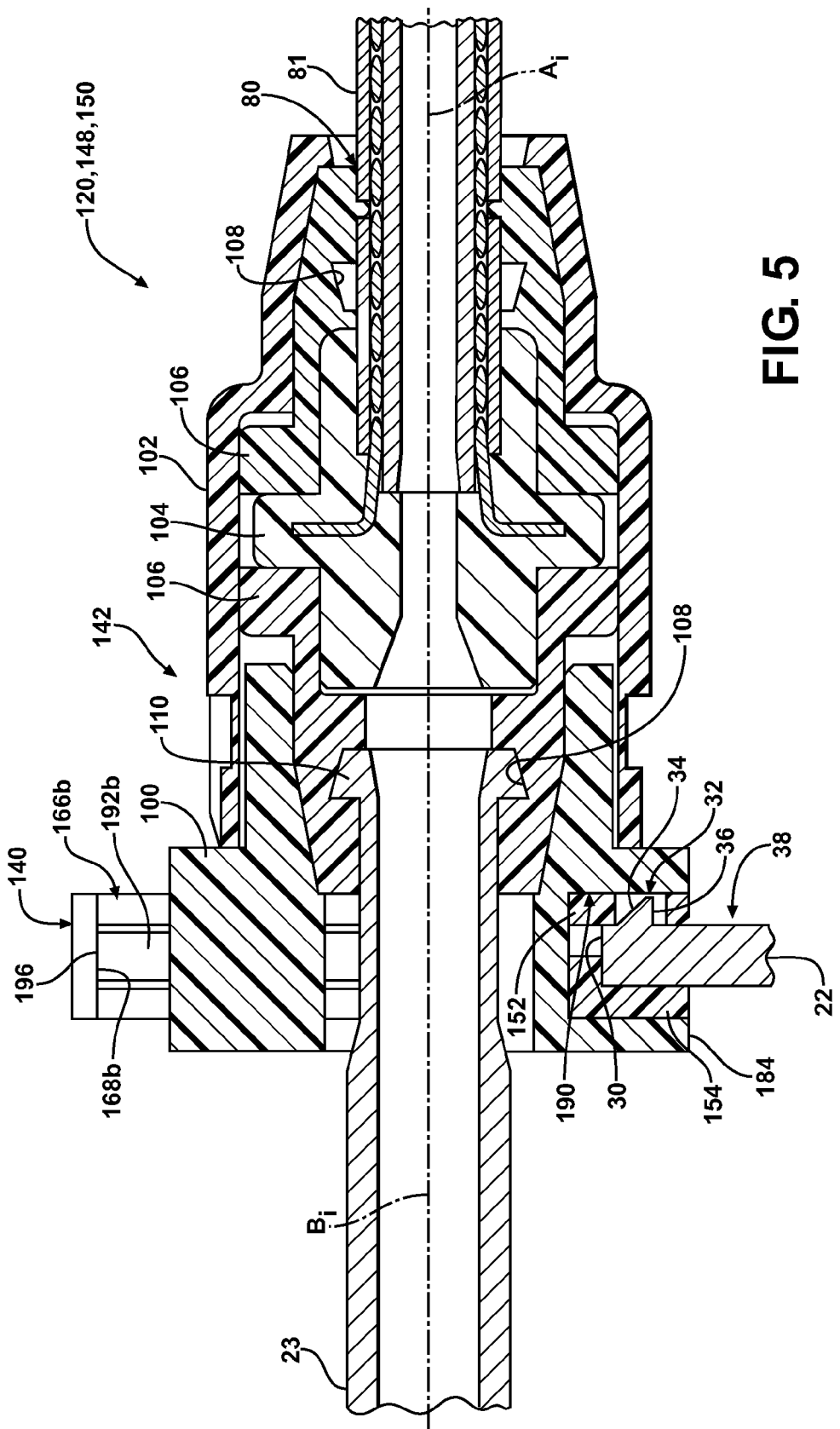
FIG. 5 is a second sectional side view of the second embodiment vertical end fitting assembly and the bracket as shown in FIG. 4, taken 90° about the longitudinal axis of the cable.
Figure 6:
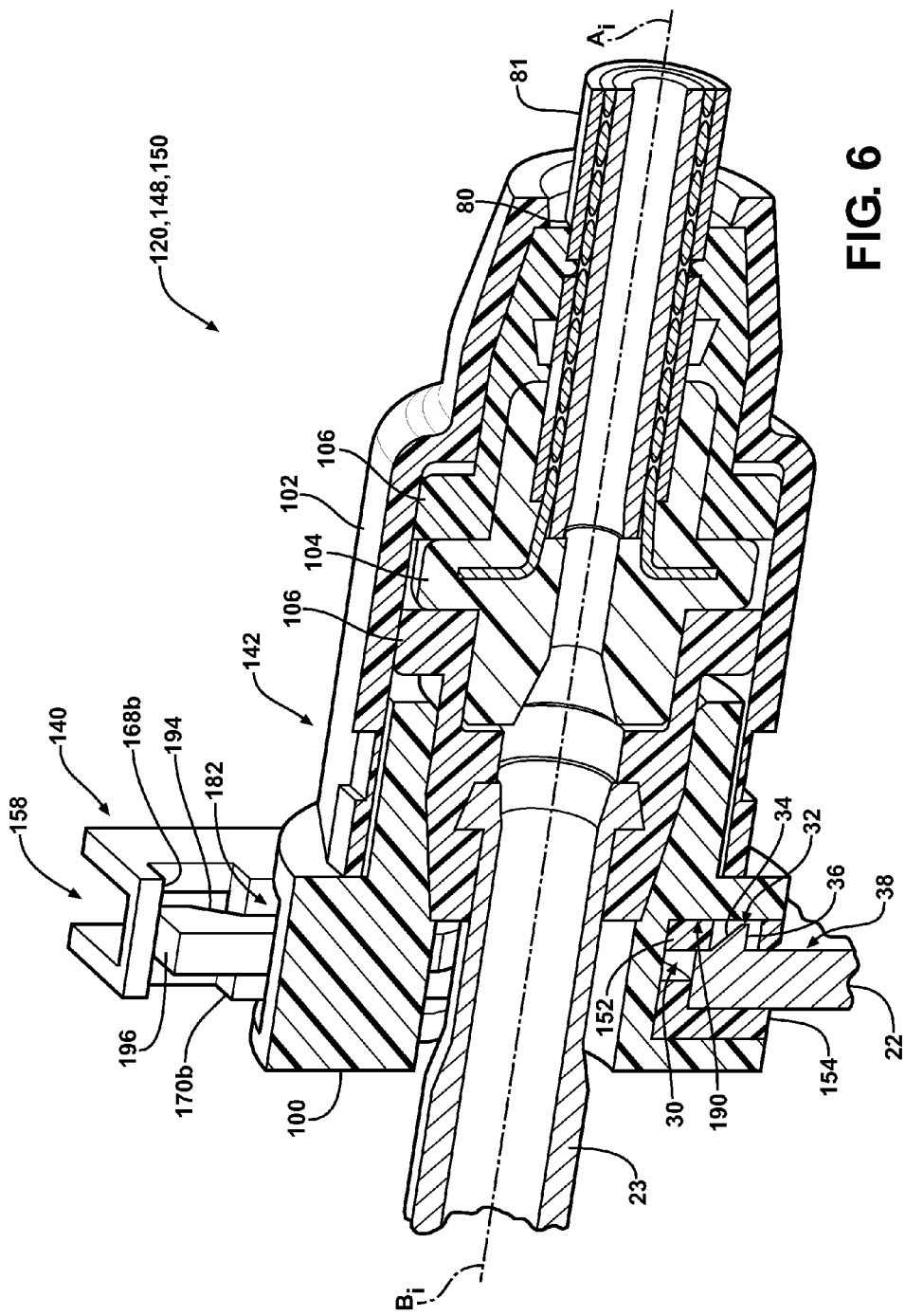
FIG. 6 is a sectional perspective view of the second embodiment vertical end fitting and the bracket as shown in FIG. 5.
Figure 7:
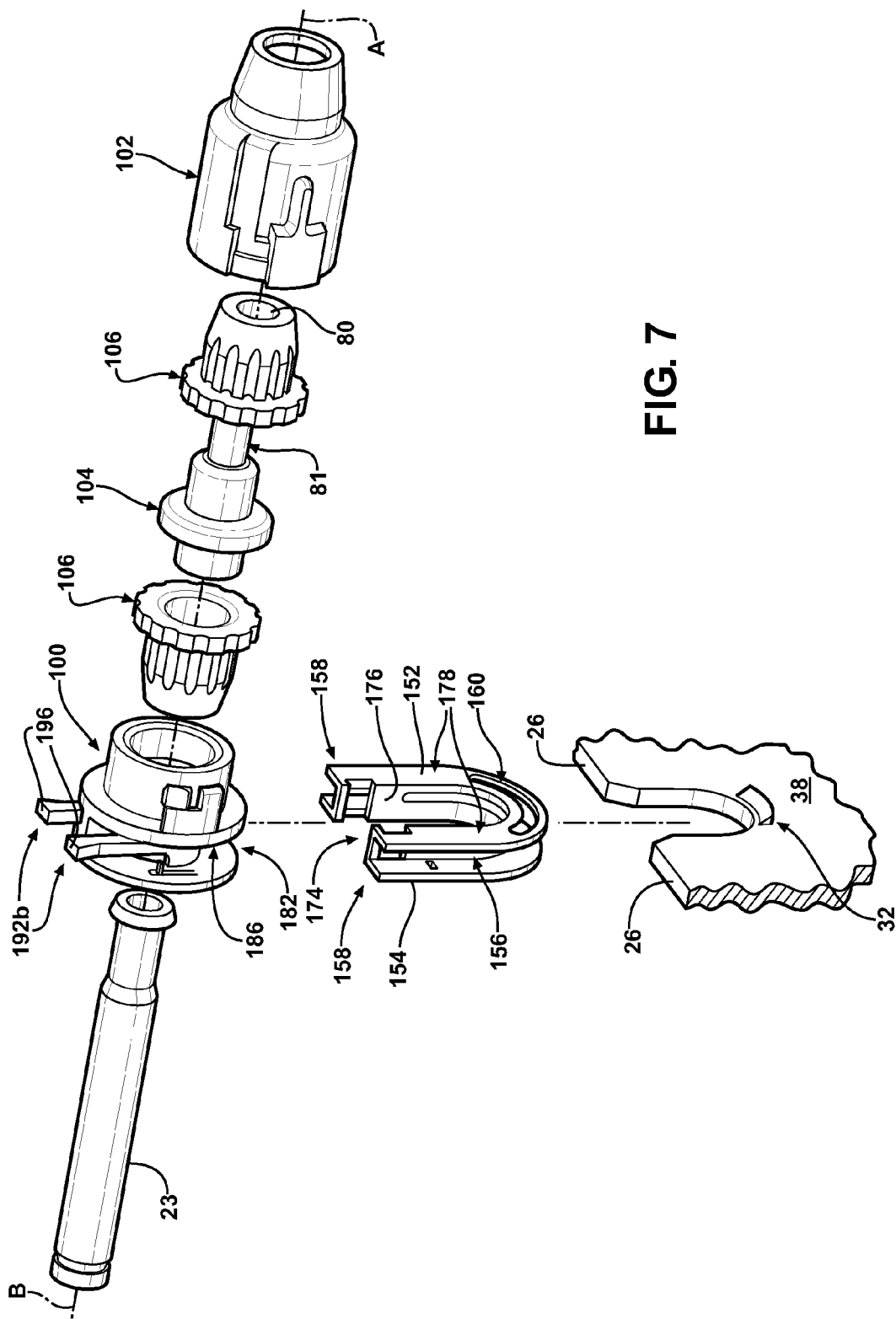
FIG. 7 is an exploded perspective view of the second embodiment vertical end fitting assembly of FIGS. 4-6 and the bracket.

FIGS. 4 and 5 show cross-sectional side views of fitting assembly 120 attached to bracket 22 that are taken 90° apart about axes $A_i$ and $B_i$. Cable end fitting assembly 120 includes retainer clip member 140 and cable end fitting housing assembly member 142. Fitting assembly 120 has a shipped or installing state 144 in which it has an unlocked relationship 146 with bracket 22. Fitting assembly 120 also has an installed state 148 in which it has a locked relationship 150 with bracket 22. Retention clip member 140 includes first flange 152 and second flange 154 between which is U-shaped groove 156 having ends 158. Flange 152 includes an aperture or void 160 defined between a bottom edge 162 and a top edge 163. Retention clip member 140 includes slot or void 166b near each end 158 of its groove 156, with each slot 166b defined between an upper edge 168b and a lower edge 170b. Retaining clip member 140 defines a U-shaped channel 174 having interior walls 176, and has axially facing surfaces 178.

Fitting member 142 has a bore 80 into which is coaxially disposed cable conduit 81, and an external circumferential groove 182 defined at its opposite axial ends by circular flange 184 and planar portions 186, the latter defining rigid retaining surface 190 that is in superposed sliding engagement with retaining clip member flange 152.

Figure 8:
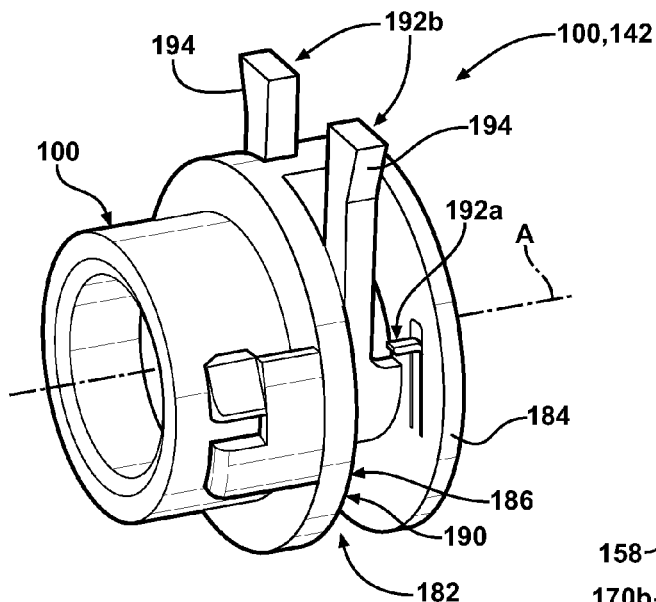
FIG. 8 is a perspective view of the cable end fitting housing of the second embodiment vertical end fitting shown in FIGS. 4-7.
Figure 9:
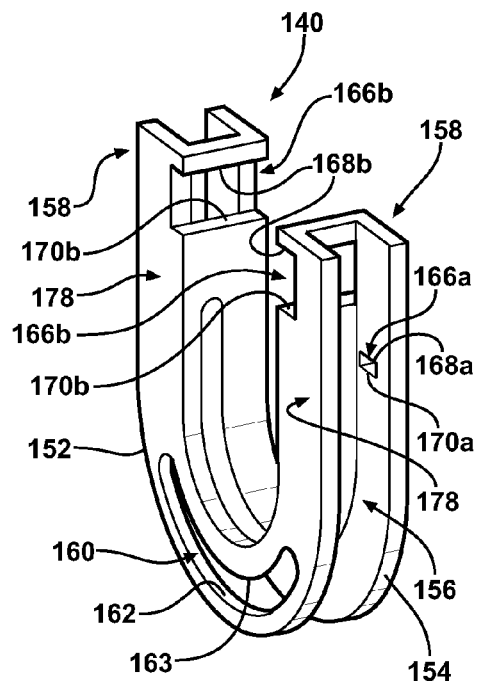
FIG. 9 is a perspective view of the retainer clip of the second embodiment vertical end fitting shown in FIGS. 4-7.
Figure 10:
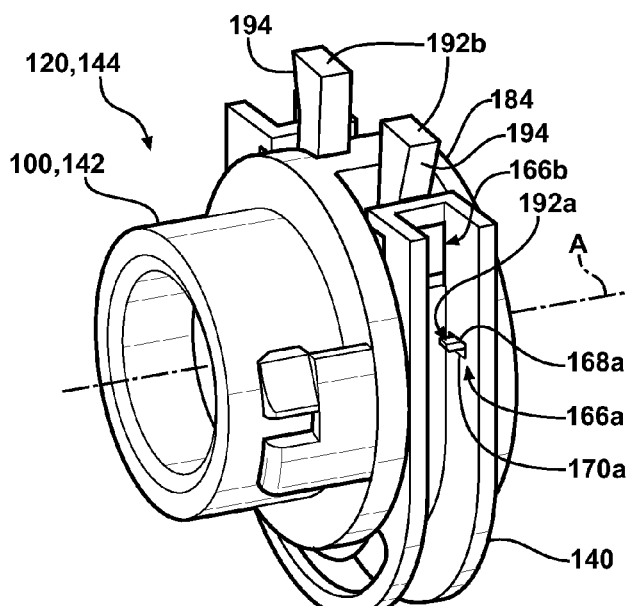
FIG. 10 is a perspective view of the retainer clip locker of the cable end fitting housing and the retainer clip of FIGS. 8 and 9 shown assembled in a shipped or installing state.
Figure 11:
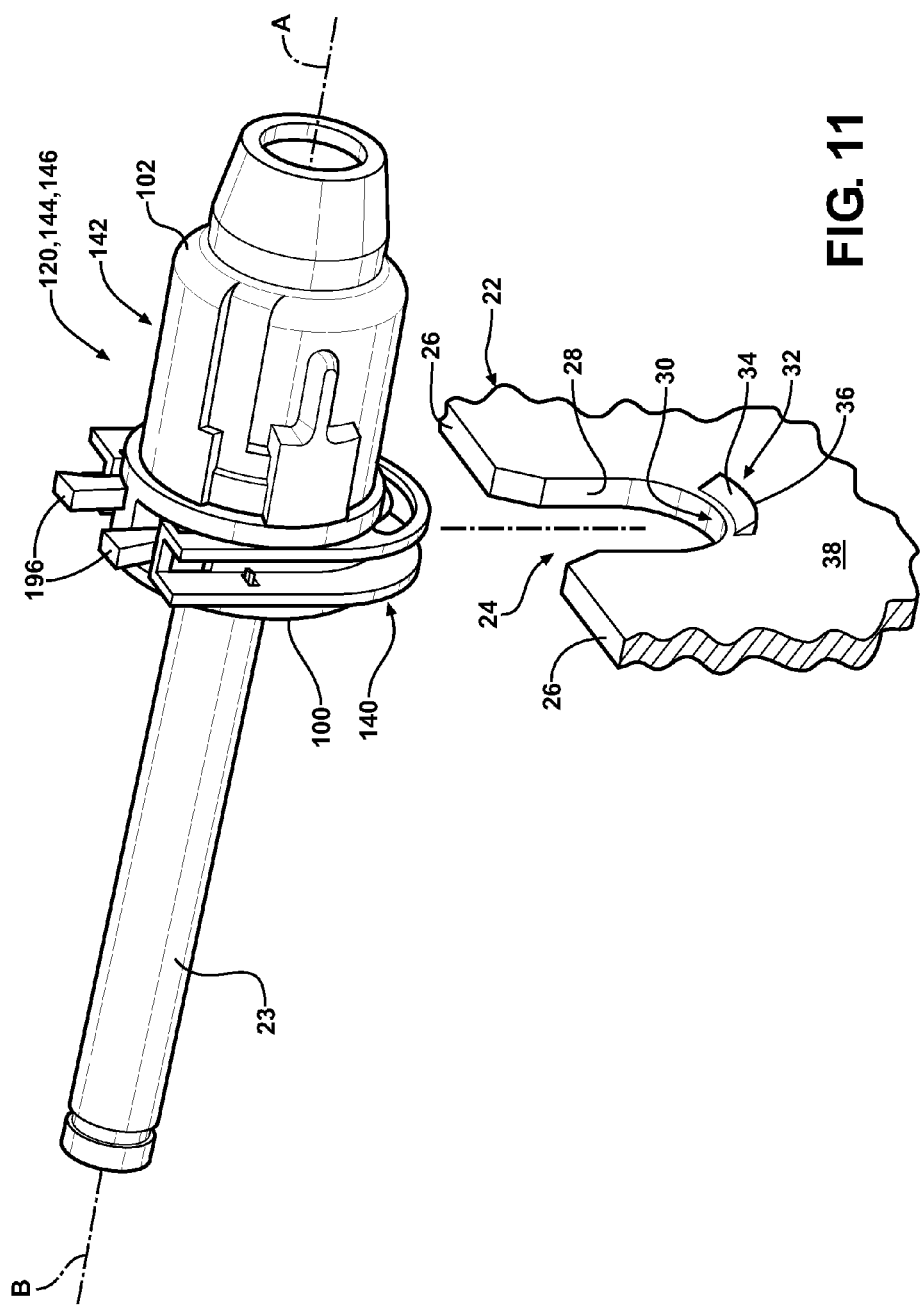
FIG. 11 is a first view illustrating the installation of the second embodiment vertical end fitting to a bracket, the cable end fitting housing and retainer clip shown in a shipped or installing state.

Referring to FIGS. 8 through 10, retainer clip locker element 100 of fitting housing assembly member 142 includes a pair of fingers 192*a* that extend into circumferential groove 182 from circular flange 184. Fingers 192*a* are received in slots 166*a* formed in flange 154 of retainer clip member 140. The engagement of fingers 192*a* and slots 166*a* stabilize fitting assembly 120 in its shipped or installing state 144. In shipped or installing state 144, the ends of integrally formed fingers 192*b* extending upwardly from retainer clip locker element 100 project above surfaces 168*b* that define slots 166*b* near groove ends 158 of retainer clip member 140. As discussed above with respect to first embodiment fitting assembly 20, second embodiment fitting assembly 120 is vertically inserted into slot 24 of bracket 22 through movement that is substantially lateral to axes A and B. Retainer clip member 140 is pushed into a seated position in slot 24, through the deflection of flange 152 by sliding engagement with upset ramped surface 34, and in its seated position upset or projection 32 is received within aperture or void 160, such that aperture bottom edge 162 and upset retaining shoulder surface 36 are interfacingly superposed.

In moving fitting assembly 120 from the installing state 144 to installed state 148, fitting housing member 142 is pushed in a direction lateral to axes A and B further into U-shaped channel 174 of retainer clip member 140, such that ramped surface 194 of each finger 192*b* is in sliding engagement with the topmost edge of each interior wall 176 of the retainer clip 140, the fingers 192*b* deflected inwardly towards each other until the retaining shoulder surfaces 196 of fingers 192*b* are moved past surfaces 168*b* of slots 166*l*, at which point fingers 192*b* move outwardly away from each other and relax, and surfaces 196 are brought into superposed relationship with surfaces 168*b* of slots 166*b*, which locks fitting members 140, 142 in their second position. Simultaneously, rigid retaining surface 190 is brought into superposed abutting relationship with flexible flange 152 and overlappingly covers aperture 160. Thus, flange 152 is sandwiched between bracket surface 38 and retaining surface 190, preventing its elastic deformation away from surface 38 and maintaining the interfacingly superposed relationship between upset shoulder surface 36 and the aperture bottom edge 162, thus completing entry to the installed state 148 establishing the locked relationship 150 between fitting assembly 120 and bracket 22.

In moving cable end fitting housing assembly 142 relative to retainer clip 140 when transitioning from the shipped or installing state 144 to the installed state 148, fingers 192*a* that are disposed within slots 166*a*, as shown in FIG. 10, are deformed such that they are pulled out of slots 166*a* and taken out of their interfitting engagement. Referring again to FIGS. 4 through 6, the exterior configuration of housing assembly member 142 of second embodiment cable end fitting assembly 120 is formed by retainer clip locker member 100 and shell 102, into which member 100 is inserted and interlocked. The axial end of cable conduit 81 is provided with a conduit overmolding 104 that is fixed to the end of conduit 81 and positioned between a pair of identical damper members 106 which may be formed of a suitable vulcanized rubber such as, for example, EPDM 45 SH A or NBR 70 SH A. Each damper 106 is provided with a circumferential groove 108 on its interior surface that defines, in the damper 106 which surrounds conduit 81, bore 80. Groove 108 is configured to receive the tapered, radially extending terminal end 110 of swivel tube 23, which is inserted into the respective damper bore during assembly of the swivel tube to fitting assembly 120. As noted above, the wire (not shown) of the cable assembly that extends through its cable conduit 81 also extends through swivel tube 23.

Referring now to FIGS. 14 through 17, there is shown a third embodiment cable end fitting assembly 220. Relative to third embodiment fitting assembly 220, and one or both of the above-described first embodiment fitting assembly 20 and second embodiment fitting assembly 120, substantially identical elements are identically numbered, and elements of fitting assembly 220 that correspond in structure and/or function to elements of fitting assembly 20 are identified by adding a prefix "2" (i.e., adding 200) to respective elements of first embodiment fitting assembly 20, or substituting prefix "2" for the prefix "1" of (or adding 100 to) the respective element numeral of fitting assembly 120. Additionally, multiple elements of fitting assembly 220 that correspond in structure and/or function to elements of fitting assemblies 20, 120 may also include or omit suffixes "a" and "b". The structure and function of identical or corresponding elements between the second and third embodiment fitting assemblies 120 and 220 and their relationships to bracket 22 are as described above except as described below or as evident from the accompanying drawings.

Cable end fitting assembly 220 includes retainer clip member 240 and cable end fitting housing assembly member 242. Fitting assembly 220 has a shipped or installing state 244 in which it has an unlocked relationship 246 with bracket 22. Fitting assembly 220 also has an installed state 248 in which it has a locked relationship 250 with bracket 22. Retention clip member 240 includes first flange 252 and second flange 254 between which is U-shaped groove 256 having ends 258. Flange 252 includes an aperture or void 260 defined between a bottom edge 262 and a top edge 263. Retention clip member 240 includes slot or void 266 near each end 258 of its groove 256, with each slot 266 defined between an upper edge 268 and a lower edge 270. Retaining clip member 240 defines a U-shaped channel 274 having interior walls 276, and has axially facing surfaces 278.

Fitting member 242 has a bore 80 into which is coaxially disposed cable conduit 81, and an external circumferential groove 282 defined at its opposite axial ends by circular flange 284 and planar portions 286, the latter defining rigid retaining surface 290 that is in superposed sliding engagement with retaining clip member flange 252.

The engagement of finger 192*a* and aperture 260 stabilizes fitting assembly 220 in its shipped or installing state 244. In shipped or installing state 244, the ends of integrally formed fingers 292*b* extending upwardly from retainer clip locker element 200 project above surfaces 268 that define slots 266 near groove ends 258 of retainer clip member 240. As discussed above with respect to first and second embodiment fitting assemblies 20 and 120, third embodiment fitting assembly 220 is vertically inserted into slot 24 of bracket 22 through movement that is substantially lateral to axes A and B. Retainer clip member 240 is pushed into a seated position in slot 24, through the deflection of flange 252 by sliding engagement with upset ramped surface 34, and in its seated position upset or projection 32 is received within aperture or void 260, such that aperture bottom edge 262 and upset retaining shoulder surface 36 are interfacingly superposed.

In moving fitting assembly 220 from the installing state 244 to installed state 248, fitting housing member 242 is pushed in a direction lateral to axes A and B further into U-shaped channel 274 of retainer clip member 240, such that ramped surface 294*b* of each finger 292*b* is in sliding engagement with the topmost edge of each interior wall 276 of the retainer clip 240, the fingers 292*b* deflected inwardly towards each other until the retaining shoulder surfaces 296*b* of fingers 292*b* are moved past surfaces 268 of slots 266, at which point fingers 292*b* move outwardly away from each other and relax, and surfaces 296b are brought into superposed relationship with surfaces 268 of slots 266, which locks fitting members 240, 242 in their second position. Simultaneously, rigid retaining surface 290 is brought into superposed abutting relationship with flexible flange 252 and overlappingly covers aperture 260. Thus, flange 252 is sandwiched between bracket surface 38 and retaining surface 290, preventing its elastic deformation away from surface 38 and maintaining the interfacingly superposed relationship between upset shoulder surface 36 and the aperture bottom edge 262, thus completing entry to the installed state 248 establishing the locked relationship 250 between fitting assembly 220 and bracket 22.

Figure 15:
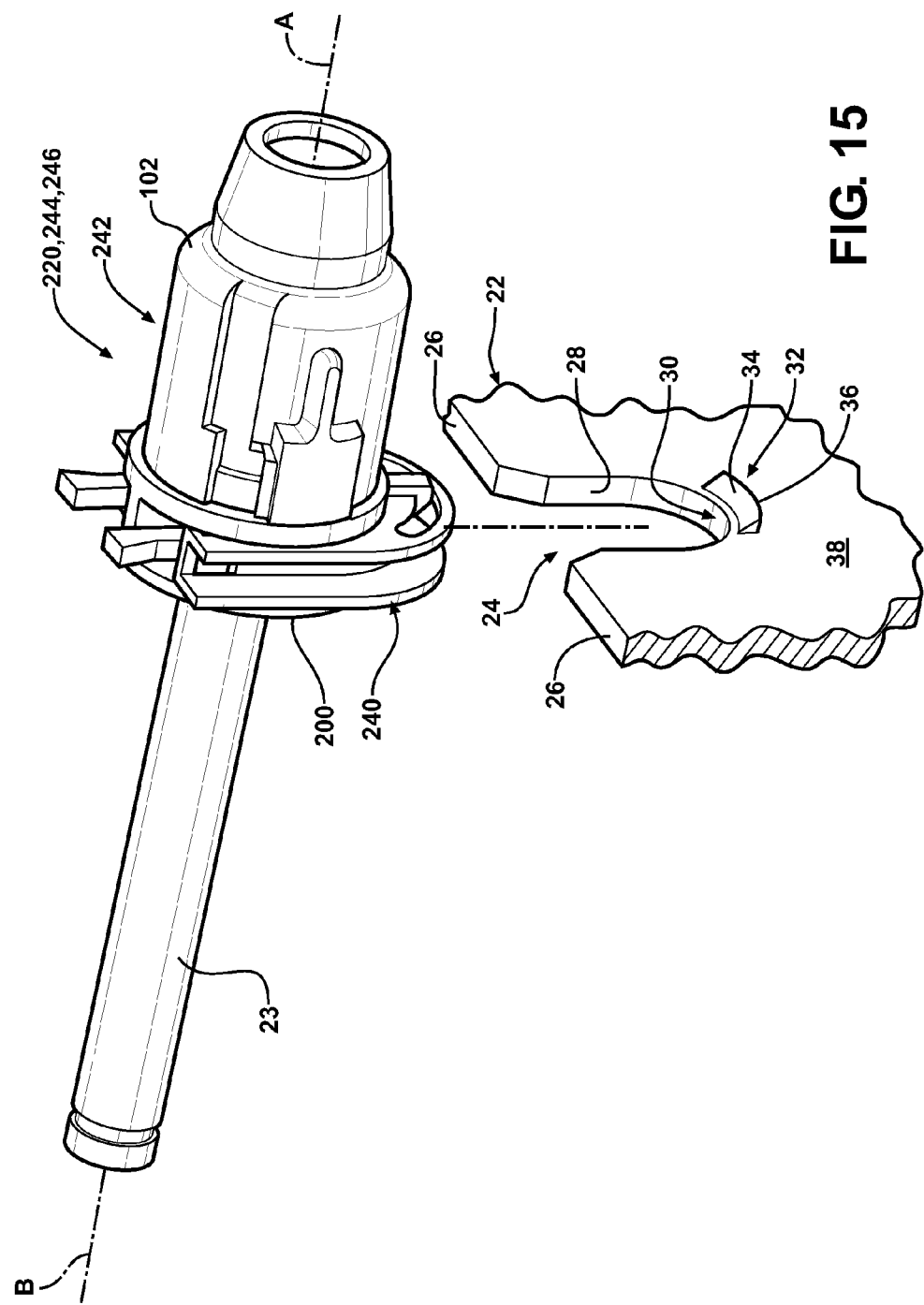
FIG. 15 is a first view illustrating the installation of the third embodiment vertical end fitting to a bracket, the cable end fitting housing and retainer clip shown in a shipped or installing state.

Referring to FIG. 15, the exterior configuration of housing assembly member 242 of third embodiment cable end fitting assembly 220 is formed by retainer clip locker member 200 and shell 102 of second embodiment housing member 142, into which member 200 is inserted and interlocked. Internally, third embodiment housing member 242 is structurally and functionally identical to second embodiment housing member 142, includes the same components, and has swivel tube 23 is inserted therein.

Figure 14:
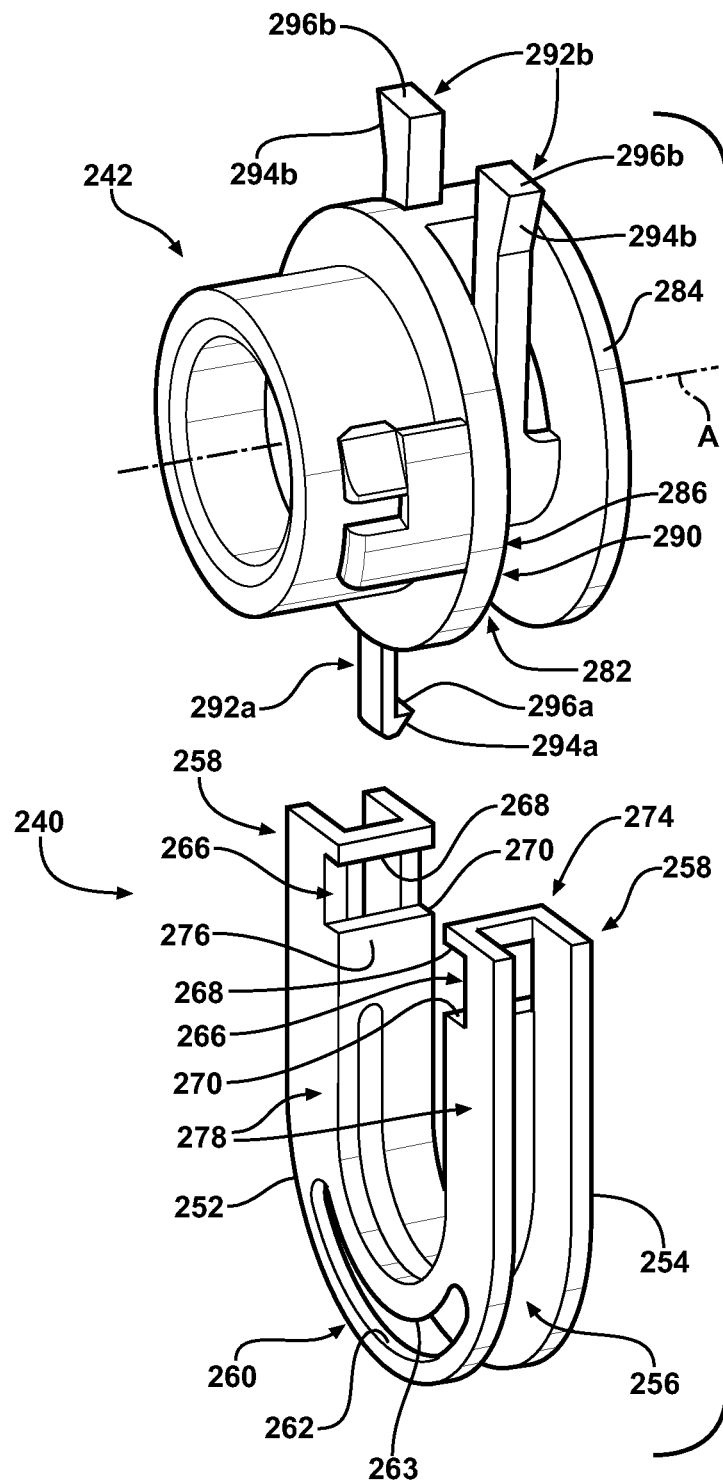
FIG. 14 is an exploded perspective view of the cable end fitting housing and retainer clip of a third embodiment.

Referring to FIG. 14, housing member 242 includes finger 292a that depends from planar portion 286 and defines at its terminal end a hook formed by ramped surface 294a and retaining shoulder surface 296a facing substantially opposite directions. In the shipped or installing state 244, retainer shoulder surface 296a is in interfacing superposition with aperture upper edge 263, and in the first position relative to retainer clip member 240, housing member 242 is thus prevented from moving in a direction away from the second position, and out of U-shaped channel 274, by the abutting engagement between retainer shoulder surface 296a and aperture upper edge 263. The oblique contact between aperture lower edge 262 and ramped surface 294a of finger 292a, and the above-discussed engagement between ramped surfaces 294b of fingers 292b and the topmost edges of retention clip member interior surfaces 276, oppose the relative movement of fitting members 240, 242 from their first position toward the second position. Thus, fitting assembly 220 is stabilized in the first position in the shipped or installing state 244, in which fitting assembly 220 and bracket 22 have an unlocked relationship 246, at least until retainer clip member 240 is moved into its seated position within slot 24.

In moving retainer clip member 240 into its seated position, wherein upset or projection 32 is captured within aperture 260, upset or projection 32 tends to deflect finger 292 out of cooperative engagement with aperture edges 262, 263 as best seen in FIG. 16. As fitting housing member 242 is pushed further into channel 274 in relatively moving fitting members 240, 242 toward the second position, finger 292a is pushed downwardly past the bottommost edge of flange 252 and into a position disposed below and out of operative engagement with retaining clip member 240.

As described above, during movement from the installing state 244 to the installed state 248, wherein fitting members 240 and 242 respectively have unlocked and locked relationships 246, 250 with bracket 22, ramp surface 294b of each finger 292b are in sliding engagement with the respective upper edge of retainer clip member interior wall 276, and the end of each finger 292b is received in its respective slot 266. Each retaining shoulder surface 296b is thus brought into superposition with an upper slot edge 268, which locks the fitting members 240, 242 in the second position, and establishes a locked relationship between fitting assembly 220 and bracket 22.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as contemplated for carrying out this invention, but that the invention will include all embodiments falling within the scope of the appended claims.

What is claimed is:

1. An apparatus adapted for securing to a bracket having an open-ended slot comprising:
    an elongate member defining a first longitudinal axis extending along a length thereof; and
    a fitting assembly attached to said elongate member for securing said elongate member to the bracket, said fitting assembly comprising:
        a first fitting member having a second longitudinal axis extending along a length of said first fitting member and aligning with said first longitudinal axis, with said first fitting member having a bore centered about said second longitudinal axis and having said elongate member coaxially extending through said bore, and said first fitting member adapted for movement relative to the bracket in a direction lateral to said second longitudinal axis; and
        a second fitting member adapted for receipt into the open end of the slot and fixed engagement with the bracket through movement relative to the bracket in a direction lateral to said second longitudinal axis;
        said first and second fitting members having first and second spaced positions relative to each other in a direction lateral to said first and second longitudinal axes with an axis defined by said lateral direction of said first and second fitting members intersecting said first and second longitudinal axes, and said first and second fitting members being simultaneously constrained against relative movement along said first and second longitudinal axes, said first and second fitting members being connected together when in both said first and second positions, and said first and second fitting members being substantially immovable relative to each other in said lateral direction relative to said first and second longitudinal axes when in said second position.

2. The fitting assembly of claim 1, wherein the elongate member is a conduit having a conduit end, and said fitting assembly secures said conduit end against longitudinal and lateral movement relative to the bracket.

3. The fitting assembly of claim 1, wherein said second fitting member has a seated position in the open-ended slot and is fixedly engageable with the bracket in said seated position, and said second fitting member includes a flange adapted for superposition relative to a planar bracket surface located adjacent the open-ended slot with said flange having an edge adjacent which a projection from the planar bracket surface is interfacingly disposed in said second fitting member seated position, movement of said second fitting member from its seated position opposed by abutting engagement of said edge with the interfacing projection.

4. The fitting assembly of claim 3, wherein said edge is an edge at least partially defining an aperture in said flange.

5. The fitting assembly of claim 3, wherein said flange is elastically deformed in a direction substantially along said second longitudinal axis by an amount sufficient to allow the projection to be relatively moved past said edge as said second fitting member is moved into or out of its said seated position.

6. The fitting assembly of claim 5, wherein said first fitting member includes a retaining surface moved into engagement with said flange and that opposes said elastic deformation of said flange in said second position, said edge being retained in an interfacing relationship with the projection in said second position.

7. The fitting assembly of claim 6, wherein relative movement of said first and second fitting members into said second position while said flange is elastically deformed in a direction substantially along said second longitudinal axis is prevented by interference of said flange with the movement of said retaining surface into a superposed position over said flange.

8. The fitting assembly of claim 1, wherein said first and second fitting members are provided with retention features that are cooperatively inter-engaged in said first position and cooperatively disengaged during relative movement from said first position toward said second position.

9. The fitting assembly of claim 8, wherein at least one of said retention features is deformed during relative movement of said first and second fitting members out of said first position.

10. The fitting assembly of claim 9, wherein said retention feature deformation is at least partially a reaction to said first and second fitting members being forced against each other into said second position.

11. The fitting assembly of claim 10, wherein said retention feature deformation is at least partially a reaction to said first and second fitting members being forced against the bracket.

12. The fitting assembly of claim 8, wherein from said first position, relative movement of said first and second fitting members in directions toward said second position is facilitated, and relative movement of said first and second fitting members in directions away from said second position is automatically prevented, by said retention features.

13. The fitting assembly of claim 12, wherein said relative movements of said first and second fitting members from said first position in directions toward and away from said second position are respectively facilitated and prevented by one of said retention features respectively slidably engaging another of said retention features that is a ramped surface and abutting another of said retention features that is a retaining shoulder surface.

14. The fitting assembly of claim 13, wherein said retention features include opposed first and second edges that at least partially define a void in one of said first and second fitting members, and a finger extending from the other of said first and second fitting members, said ramped and retaining shoulder surfaces defined on said finger and facing in substantially opposite directions, said first edge and said retaining shoulder surface superposed in said first position, said second edge slidably engaged with said ramped surface upon movement from said first position toward said second position.

15. The fitting assembly of claim 8, wherein said fitting assembly has a shipped or installing state in which said first and second fitting members are stabilized in said first position, and an installed state in which said first and second fitting members are retained in said second position and said second fitting member is in fixed engagement with the bracket when said fitting assembly is received in the open-ended slot.

16. The fitting assembly of claim 1, wherein said first and second fitting members are provided with retention features that are cooperatively disengaged in said first position and during relative movement toward said second position, and wherein said retention features are biased into cooperative engagement in said second position.

17. The fitting assembly of claim 16, wherein at least one of said retention features is deformed during relative movement of said first and second fitting members out of said first position.

18. The fitting assembly of claim 17, wherein said retention feature deformation is at least partially a reaction to said first and second fitting members being forced against each other into said second position.

19. The fitting assembly of claim 18, wherein said retention feature deformation is at least partially a reaction to said first and second fitting members being forced against the bracket.

\* \* \* \* \*